(12) United States Patent
Marshall

(10) Patent No.: US 7,004,524 B2
(45) Date of Patent: Feb. 28, 2006

(54) HANDLING DEVICE WITH A REVERSIBLE TOROIDAL GRIPPING MEMBER

(75) Inventor: Adrian Richard Marshall, Aylesbury (GB)

(73) Assignee: RHBB (IB) Limited, Buckinghamshire (GB)

(*) Notice: Subject to any disclaimer, the term of this patent is extended or adjusted under 35 U.S.C. 154(b) by 231 days.

(21) Appl. No.: 10/257,513

(22) PCT Filed: Apr. 10, 2001

(86) PCT No.: PCT/GB01/01621

§ 371 (c)(1),
(2), (4) Date: Feb. 24, 2003

(87) PCT Pub. No.: WO01/79089

PCT Pub. Date: Oct. 25, 2001

(65) Prior Publication Data

US 2003/0160470 A1   Aug. 28, 2003

(30) Foreign Application Priority Data

Apr. 13, 2000   (GB) .................................... 0008986

(51) Int. Cl.
*B25J 15/00*   (2006.01)
(52) U.S. Cl. .................... 294/86.4; 294/99.1; 294/907; 901/30; 901/46
(58) Field of Classification Search ................ 294/1.1, 294/86.4, 99.1, 100, 119.1, 119.3, 93, 98.1, 294/907; 901/30, 31, 36, 39, 46, 47; 56/328.1, 56/330, 332

See application file for complete search history.

(56) References Cited

U.S. PATENT DOCUMENTS

| | | | |
|---|---|---|---|
| 2,763,507 A * | 9/1956 | Haley | 294/93 |
| 3,284,123 A * | 11/1966 | Adams | 294/15 |
| 3,347,545 A * | 10/1967 | Nichols | 472/51 |
| 4,652,204 A * | 3/1987 | Arnett | 414/751.1 |

FOREIGN PATENT DOCUMENTS

| | | | | |
|---|---|---|---|---|
| EP | 0 364 832 A1 | | 4/1990 | |
| GB | 1031108 | * | 5/1966 | ............... 294/86.4 |
| SU | 1151-451 | * | 4/1985 | ............... 294/99.1 |
| WO | 88/01924 | | 3/1988 | |

OTHER PUBLICATIONS

Patent Abstracts of Japan., vol. 001, No. 086, Mar. 17, 1987, JP 61241032, Oct. 27, 1986, Taguchi Hidefumi, Omron Tateisi Electronics Co., Belt Type Work Hand Apparatus.

* cited by examiner

*Primary Examiner*—Dean J. Kramer
(74) *Attorney, Agent, or Firm*—RatnerPrestia

(57) ABSTRACT

A handling device includes a gripping member and a support structure that supports the gripping member. The gripping member includes a flexible, substantially toroidal wall member having an outer wall portion and an inner wall portion that defines an axial passageway through the gripping member. A fluid fills the volume enclosed by the wall member. The support structure includes a drive mechanism that engages the wall member and is constructed and arranged to provide relative axial movement between the inner and outer wall portions.

18 Claims, 12 Drawing Sheets

Fig. 1A  Fig. 1B  Fig. 1C

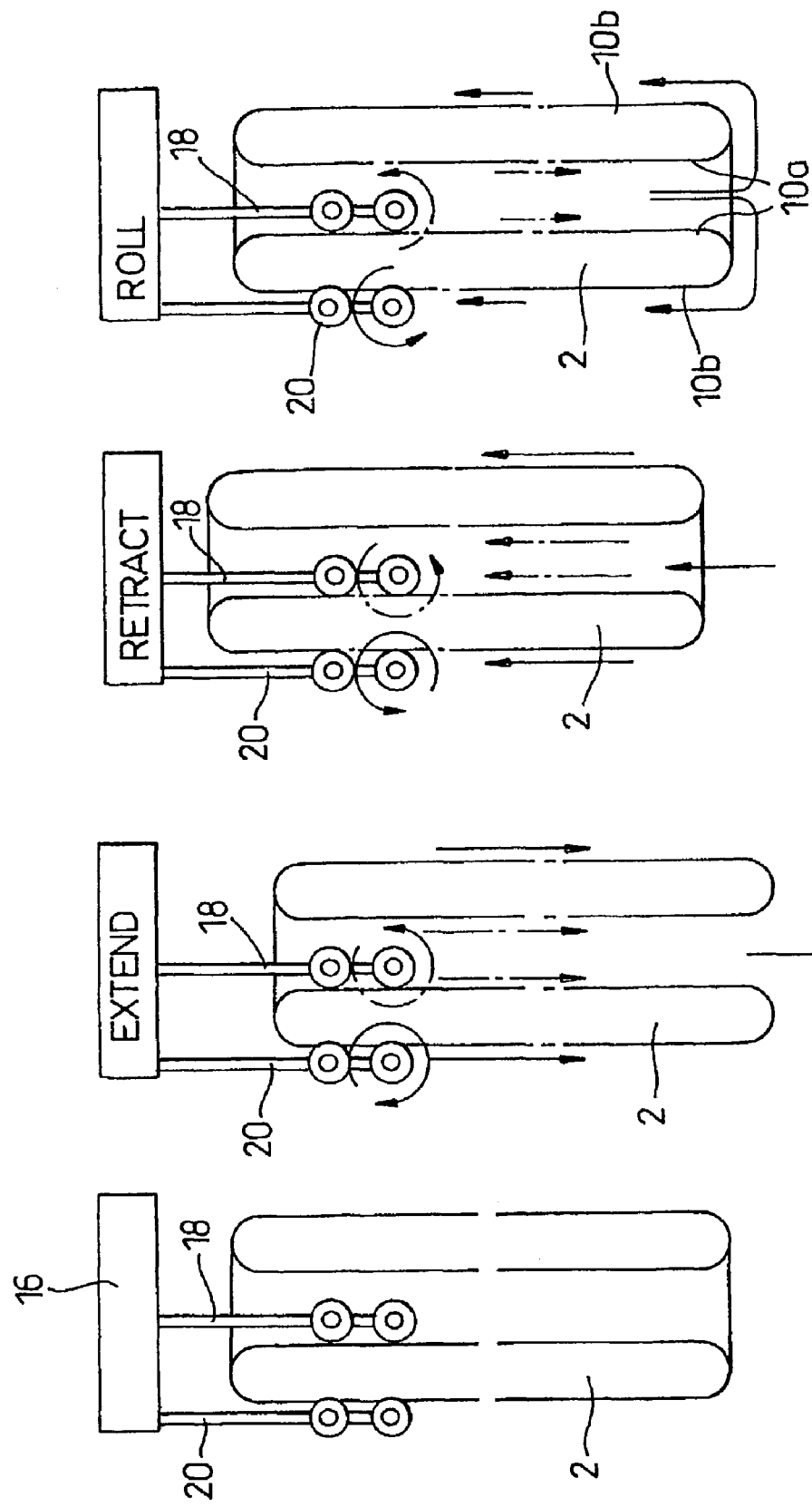

HANDLING DEVICE WITH A REVERSIBLE TOROIDAL GRIPPING MEMBER

This application is the U.S. national phase application of PCT International Application No. PCT/GB01/01621 filed 10 Apr. 2001.

The present invention relates to a handling device and in particular, but not exclusively, to a handling device for goods that are generally considered difficult to handle, for example goods that are soft, delicate, irregular in size and shape or sticky, or a combination of these and other properties.

Many handling devices are available, most of these being modelled on the gripping action of the human hand. However, few of these are suitable for handling goods of the types mentioned above, and such goods often therefore are handled by hand. However, this impedes automation and in certain circumstances leads to additional problems, such as contamination of the goods and exposure of personnel to hazardous or unpleasant materials. There is a need therefore for a handling device that is suitable for handling such goods.

More specifically, in agriculture, there is a need for a device that is capable of harvesting soft fruits without damaging them, and for sorting and grading goods of irregular size and shape, such as vegetables.

In the food industry, there is a problem with handling goods that are soft and easily damaged, or irregular in shape (for example, bakery goods). In addition, there is a need for a device that can handle flowable goods such as uncooked dough, sticky goods, hot goods (for example goods in an oven), or frozen goods. Furthermore, where there is a risk of cross-contamination, it is important that the food contacting part of the device should be easily cleaned or disposable.

In other situations, it may be necessary to handle hazardous goods such as nuclear waste, or goods that are contaminated with dangerous chemical or biological waste, or objects that are simply unpleasant to handle, such as insects, laboratory animals, or dog faeces.

Finally, there is a need for a general purpose handling device for use by people with an impaired handling ability, such as people with a disability or who suffer from Parkinson's disease.

It is an object of the present invention to provide a handling device that mitigates at least some of the aforesaid problems.

According to the present invention there is provided a handling device including a gripping member and a support structure that supports the gripping member, wherein the gripping member includes a flexible, substantially toroidal wall member having an outer wall portion and an inner wall portion defining an axial passageway that extends through the gripping member, and a fluid that fills the volume enclosed by the wall member, wherein the support structure includes a drive mechanism that engages the wall member and is constructed and arranged to provide relative axial movement between the inner and outer wall portions.

Providing relative axial movement between the inner and outer wall portions causes the toroidal wall member to rotate through the axial passageway and around the exterior of the gripping member. An object placed at the entrance of the passageway will be enveloped by the gripping member and drawn into the passageway. However, because the wall member is flexible, it will conform to the object, thereby gripping it without causing damage. Conversely, by rotating the wall member in the opposite direction, the object will be rejected from the passageway and released from the gripping device. The rolling action of the wall member as it releases the object is ideal for releasing sticky objects, which peel off the gripping member without adhering to it.

The device is suitable for handling objects of different sizes and shapes, since the gripping member conforms to the object. It also has a self-centring action, drawing objects inwards towards the axial passageway, even if they are not located precisely on the axis of the device.

A further advantage of the handling device is that it is capable of gripping an object without having to reach behind the object. It is therefore ideal for gripping objects where only the front face of the object is accessible, such as a foreign object that is stuck inside a patient's nose or ear.

The wall member may be made of an elastomeric material, for example natural or synthetic rubber. This provides a highly flexible surface that conforms well to the object being picked up and also rolls well when the drive mechanism is activated.

The fluid that fills the gripping member may be a liquid or a gas. Advantageously, the pressure of the fluid in the gripping member is substantially equal to atmospheric pressure (or ambient pressure, if this is not the normal atmospheric pressure). The gripping member then exerts very little pressure on the object being lifted, so minimising the risk of causing damage. The handling device may include means for adjusting the pressure of the fluid in the gripping member.

Preferably, the gripping member contains a lubricant to reduce friction between the sections of the wall member as they roll around the end of the toroid.

The handling device preferably includes an inner drive mechanism that engages the inner wall portion and is constructed and arranged to provide relative axial movement between the inner wall portion and the support structure, and an outer drive mechanism that engages the outer wall portion and is constructed and arranged to provide relative axial movement between the outer wall portion and the support structure. By driving both the inner and the outer wall portions, a full range of movement of the gripping member can be provided.

The inner and outer drive mechanisms may be interlinked for opposed movement, or the inner and outer drive mechanisms may be capable of independent movement. This latter arrangement permits axial movement of the gripping member relative to the support structure.

Advantageously, the drive mechanism engages a first one of said inner and outer wall portions and the support structure engages a second one of said inner and outer, wall portions, the drive mechanism being constructed and arranged to provide relative axial movement between the first wall portion and the support structure. This provides a particularly simple drive mechanism. The drive mechanism may be constructed such that it engages the inner wall portion and the support structure engages the outer wall portion, or alternatively such that it engages the outer wall portion and the support structure engages the inner wall portion.

The drive mechanism may include one or more drive belts that engage the wall member. This provides an effective method of driving the flexible wall member and allows for continuous rotation of the wall member in either direction. Preferably, the handling device includes a plurality of radially-spaced drive mechanisms.

The axial length of the toroidal wall member may be greater than its diameter, and is preferably at least twice its diameter, providing, an, elongate toroid. The axial passageway through the gripping member will also then be elongate, allowing it to accommodate and grip most objects securely.

The handling device may include a sensor for sensing the presence of an object in the passageway. This may be linked to a control device, which stops the drive mechanism as soon as an object is detected in the passageway. The sensor preferably senses light reflected from an object in the passageway.

The handling device may include a sensor for sensing the position of the gripping member relative to the support structure. This may also be linked to a control device, which controls the position of the gripping member relative to the support structure.

Various embodiments of the present invention will now be described, byway of example, with reference to the accompanying drawings, in which:

FIGS. 3a to 3d are side sections, illustrating the principles of operation of the handling device shown in FIG. 2;

FIG. 16 illustrates use of a handling device as shown in FIG. 1a.

Figure 1:
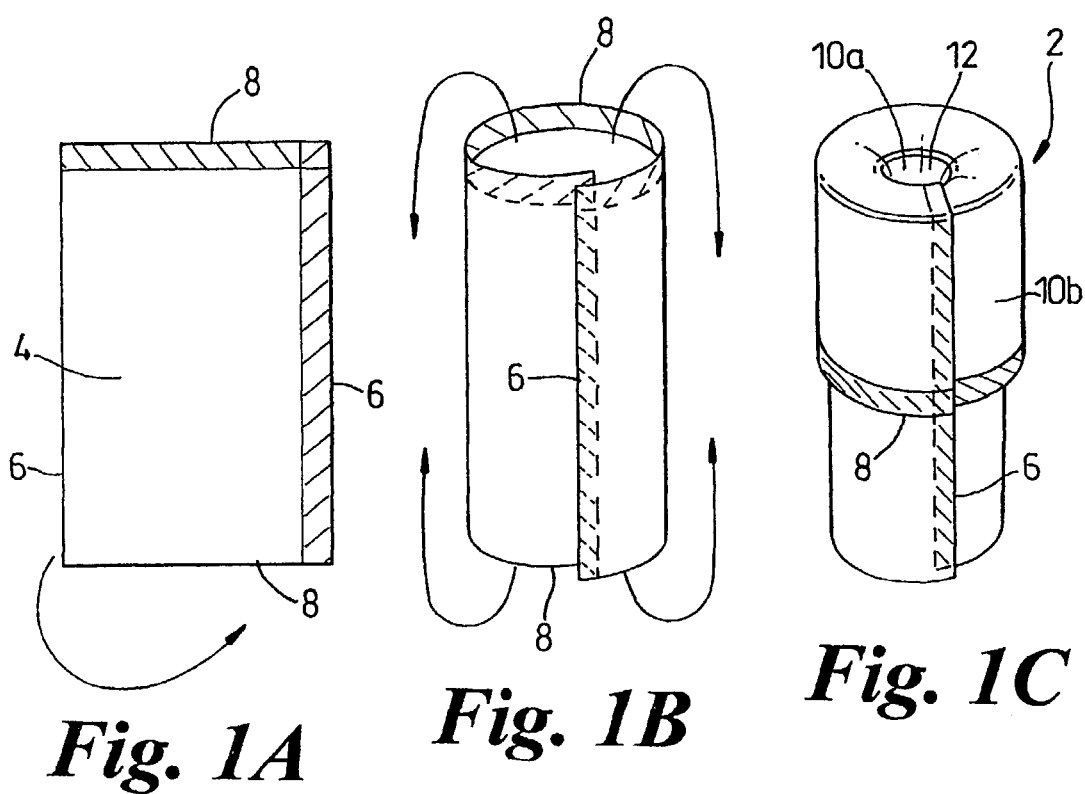
FIGS. 1a, 1b and 1c illustrate a method of constructing a flexible gripping member, forming part of a handling device according to an embodiment of the invention.

A method of constructing a flexible gripping member 2 that forms part of a handling device according to the invention is illustrated in FIGS. 1a, 1b and 1c. As shown in FIG. 1a, the gripping member 2 is constructed from a rectangular sheet 4 of an elastomeric material, for example natural or synthetic rubber, having two long side edges 6 and two shorter end edges 8. The two side edges 6 are brought together as shown in FIG. 1b and joined, for example using an adhesive, forming a cylindrical tube. Alternatively, a preformed tube may be used. The end edges 8 are then brought together and joined, forming a gripping member 2, as shown in FIG. 1c, that has a continuous toroidal wall 10 comprising an inner wall portion 10a and an outer wall portion 10b.

A passageway 12 defined by the inner wall portion 10a extends axially through the gripping member 2. The wall 10 can rotate, the inner portion 10a passing through the passageway 12 in one direction while the outer portion 10b travels in the opposite direction around the outside of the gripping member 2. It will be understood that the entire wall 10 can rotate through the passageway 12 and that the terms "inner wall portion" and "outer wall portion" refer to the portions of the wall that form the inner and outer surfaces of the toroidal gripping member 2 at that time.

The volume enclosed by the toroidal wall 10 of the gripping member 2 is filled with a fluid, for example a liquid such as purified water, or a gas such as air. The fluid is at a low pressure, which allows the gripping member 2 to deform easily. The enclosed volume may also include a lubricant, for example an oil or a fine powder such as talc, which allows the inner and outer portions 10a, 10b of the wall 10 to pass over each other with very little friction.

Figure 2:
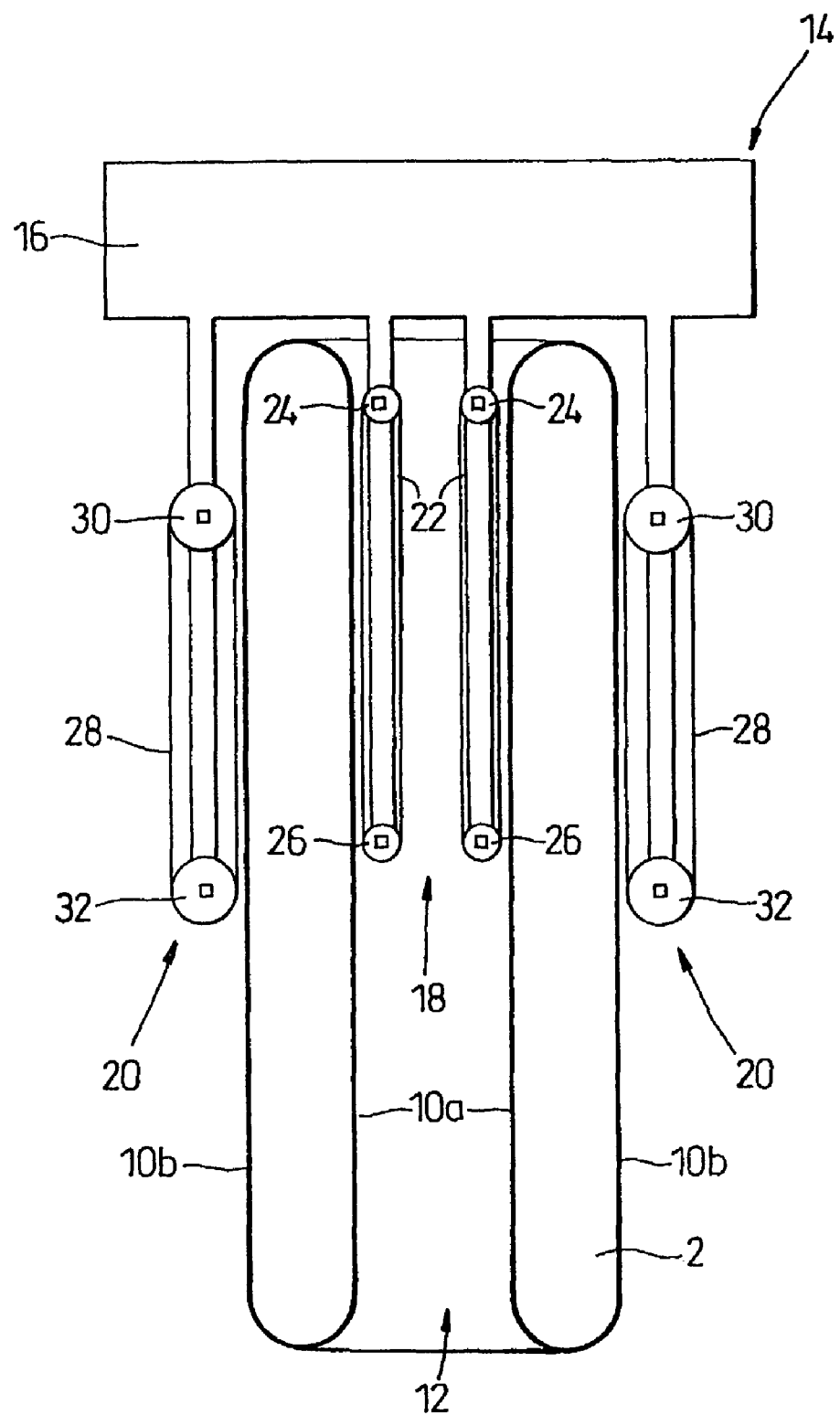
FIG. 2 is a side section of a first handling device.

A handling device 14 that includes a flexible gripping member 2 is shown in cross-section in FIG. 2. The gripping member 2 is supported by a support structure 16 that includes an inner drive mechanism 18 and an outer drive mechanism 20.

The inner drive mechanism 18 is located within the axial passageway 12 in the gripping member 2 and includes a set of drive belts 22, each of which is mounted on a pair of pulley wheels 24, 26. The inner pulley wheel 24 is driven by a drive motor (not shown). The drive belt 22 has a toothed inner surface that engages corresponding tooth formations (not shown) on the pulley wheels 24, 26 and a flat outer surface that engages the inner portion 10a of the toroidal wall. The outer surface of the belt 22 may be roughened, for example by means of an abrasive material adhered to that surface, to provide a high coefficient of friction between the belt and the inner portion 10a of the toroid wall. The number of drive belts 22 provided in the inner drive mechanism may vary from two to eight or more, but will usually be four.

The outer drive mechanism 20 engages the outer portion 10b of the toroidal wall and is similar to the inner drive mechanism, including a set of drive belts 28, each of which is mounted on a pair of pulley wheels 30, 32. The inner pulley wheel 30 is driven by a drive motor (not shown).

The inner drive mechanism 18 and the outer drive mechanism 20 can be driven independently, allowing the handling device 14 to be operated according to the principles of operation illustrated in FIGS. 3a to 3d. For simplicity, only one inner drive mechanism 18 and one outer drive mechanism 20 is shown in each of these drawings.

In FIG. 3a, the inner drive mechanism 18 and the outer drive mechanism 20 are both stationary. The gripping member 2 is also therefore stationary. In FIG. 3b, the inner drive mechanism 18 is rotating anti-clockwise and the outer drive mechanism 20 is rotating clockwise. The inner and outer walls 10a, 10b of the gripping member 2 are both being driven in the same direction, with the result that the gripping member 2 is being extended from the support structure 16. The drive directions of the drive mechanisms are reversed in FIG. 3c, with the result that the gripping member 2 is being retracted towards the support structure 16. In FIG. 3d, the inner drive mechanism 18 and the outer drive mechanism 20 are both being driven anti-clockwise. The inner wall 10a of the gripping member 2 is therefore being driven away from the support structure 16, while the outer wall 10b is being driven towards it. As a result, the wall 10 is rotating around the gripping member while the gripping member remains in the same place.

FIGS. 4a to 4g illustrate schematically a typical sequence of handling operations, using the handling device shown in FIG. 2, to pick up and place an object. In this example, the object 34 represents a fruit such as an cherry that is attached to a stalk 36. The handling device 14 is presumed to be attached to a support structure (not shown), for example a robotic arm.

Figures 4A, 4B, 4C, 4D, 4E, 4F, 4G:
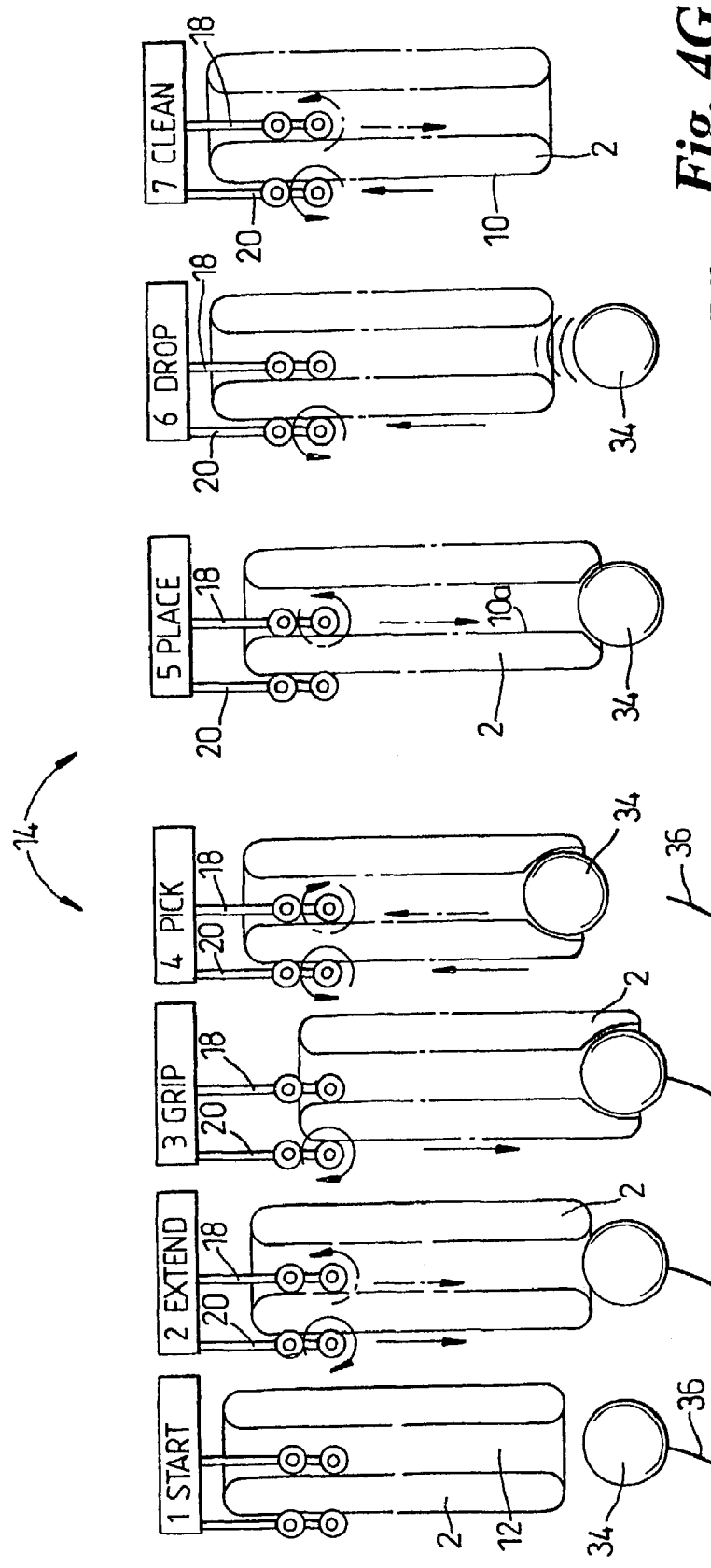
FIGS. 4a to 4g are side sections, illustrating a typical sequence of operations using the handling device shown in FIG. 2.

The handling device 14 is positioned so that the object 34 is close to the free end of the gripping member 2 and approximately in line with the passageway 12 (FIG. 4a). The gripping member is extended towards the object 34 by rotating the inner and outer drives in opposite directions (FIG. 4b), such that the inner and outer wall portions are both driven towards the object. When the end of the gripping member touches the object, the inner drive 18 stops but the outer drive 20 continues to rotate, so that the gripping member 2 surrounds and grips the object (FIG. 4c). Both drives are then activated to withdraw the inner and outer wall portions, thereby retracting the gripping member 2 and picking the object 34 from the stalk 36 (FIG. 4d).

The handling device 14 is relocated to the position where the object is to be placed, and the inner drive 18 is then activated, driving the inner wall 10a and the object 34 outwards (FIG. 4e). The inner drive then stops and the outer drive 20 is activated, releasing the object (FIG. 4f). Finally, both drives rotate in the same direction, causing the wall 10 of the gripping member to rotate (FIG. 4g). This produces a cleaning action, preventing cross-contamination of products picked up by the device.

Figure 5:
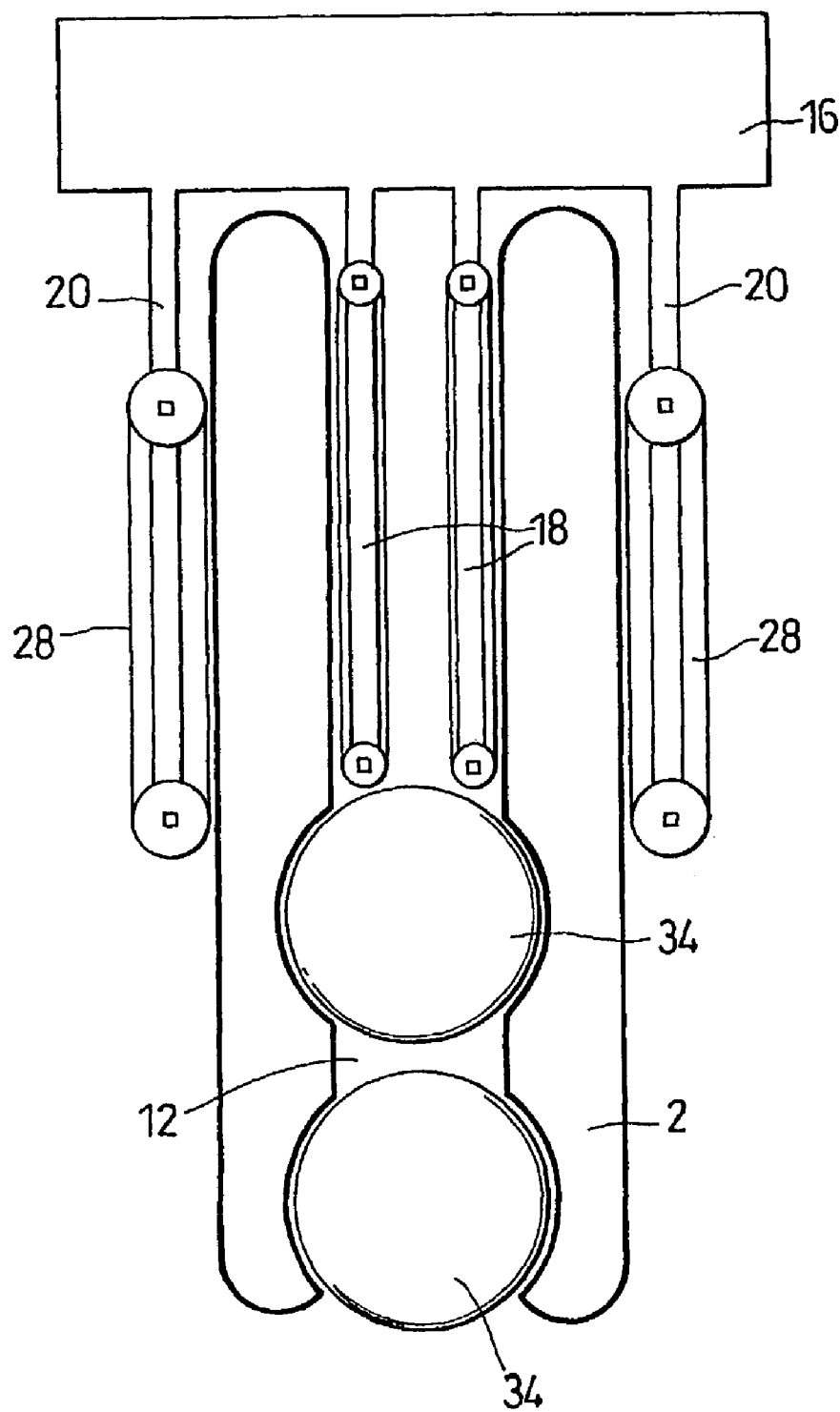
FIG. 5 is a further side section of the handling device shown in FIG. 2.

FIG. 5 is a further cross-sectional view of the handling device on an enlarged scale, showing that it can accommodate more than one object 34 of a suitable size in the passageway 12. This provides an advantage in terms of work rate, in that the device does not have to be relocated to the set-down position every time an object has been picked up.

Figure 6:
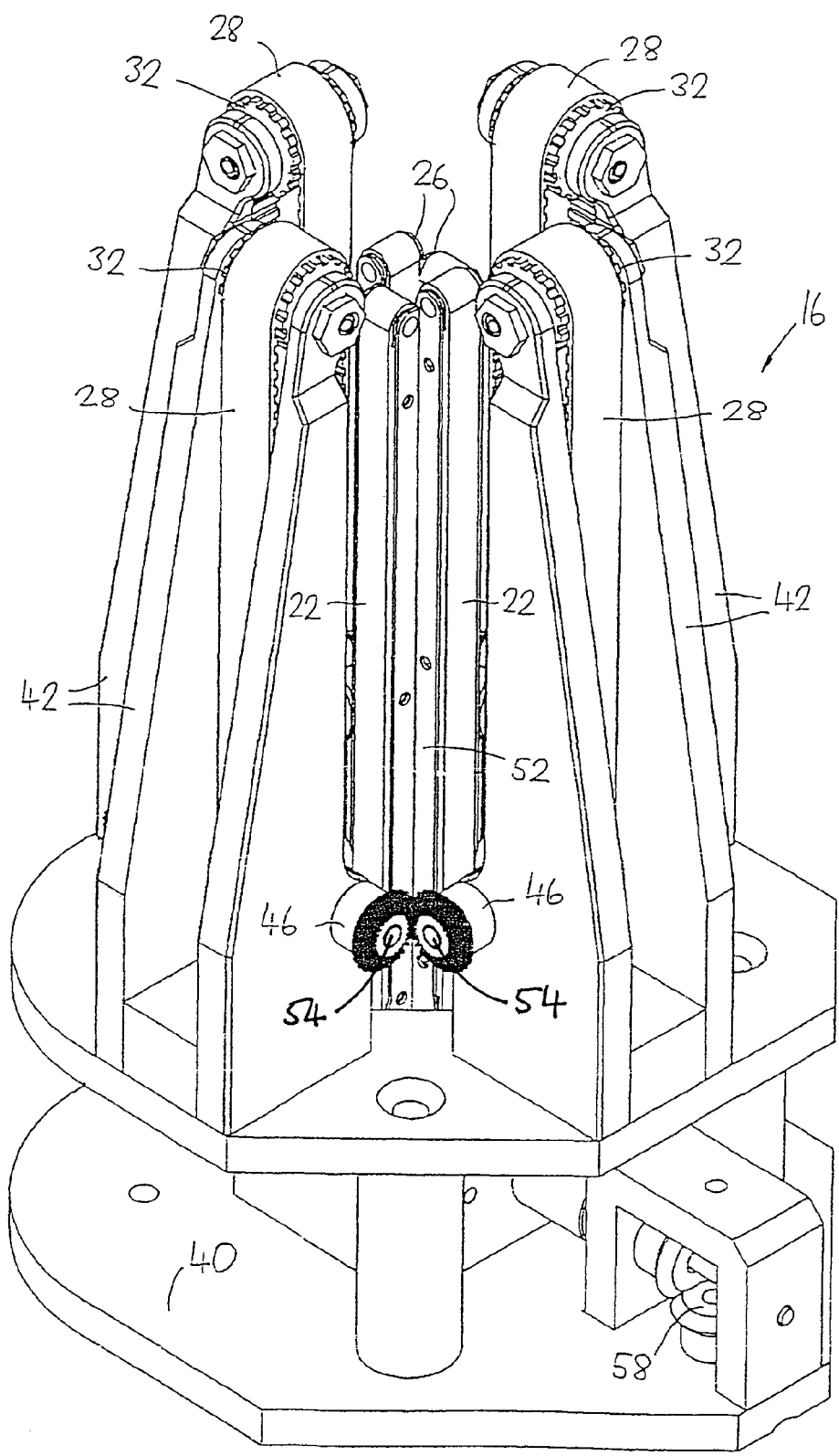
FIG. 6 is an isometric view of the support structure of a handling device.
Figure 7:
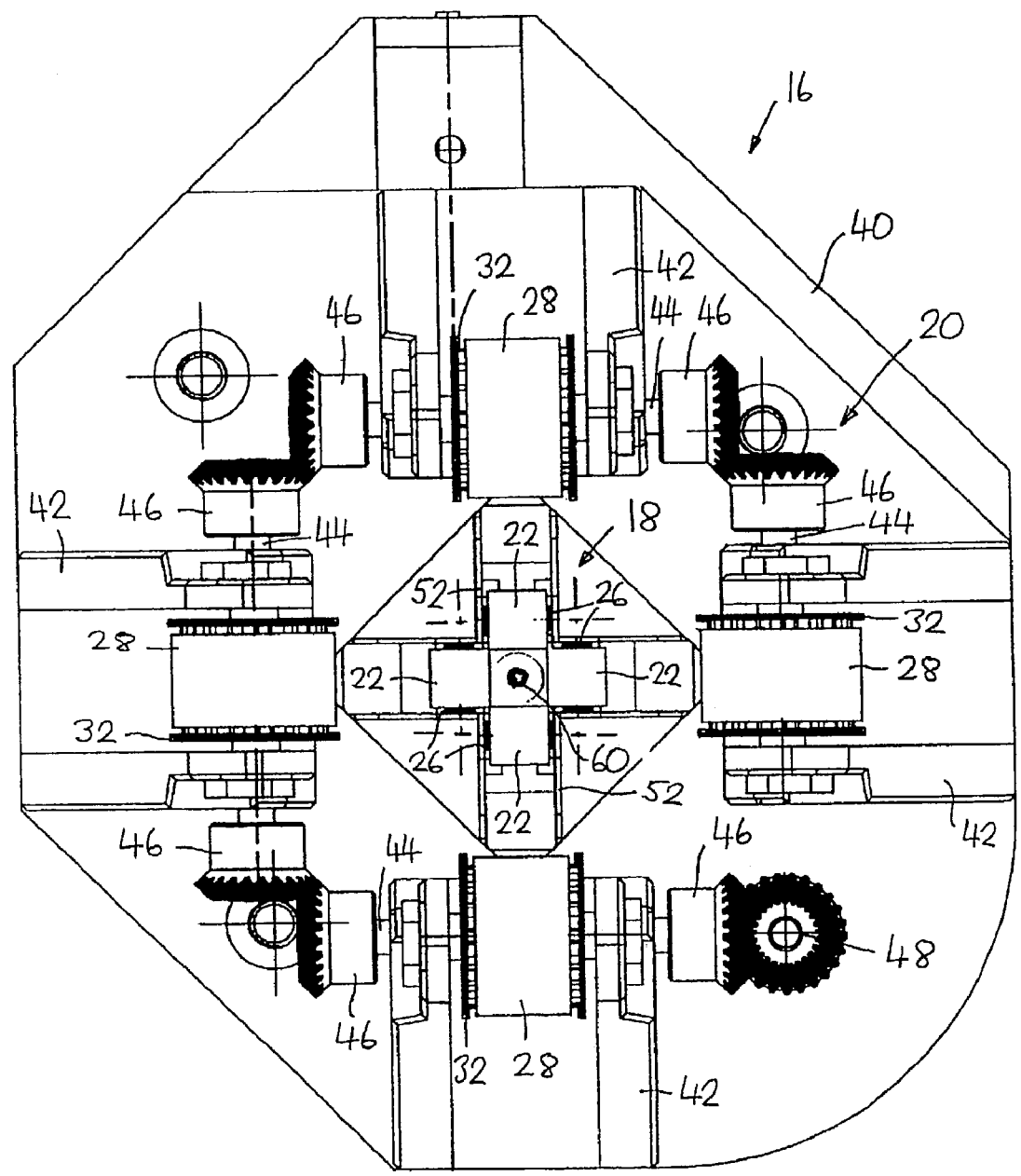
FIG. 7 is an end view of the support structure.
Figure 8:
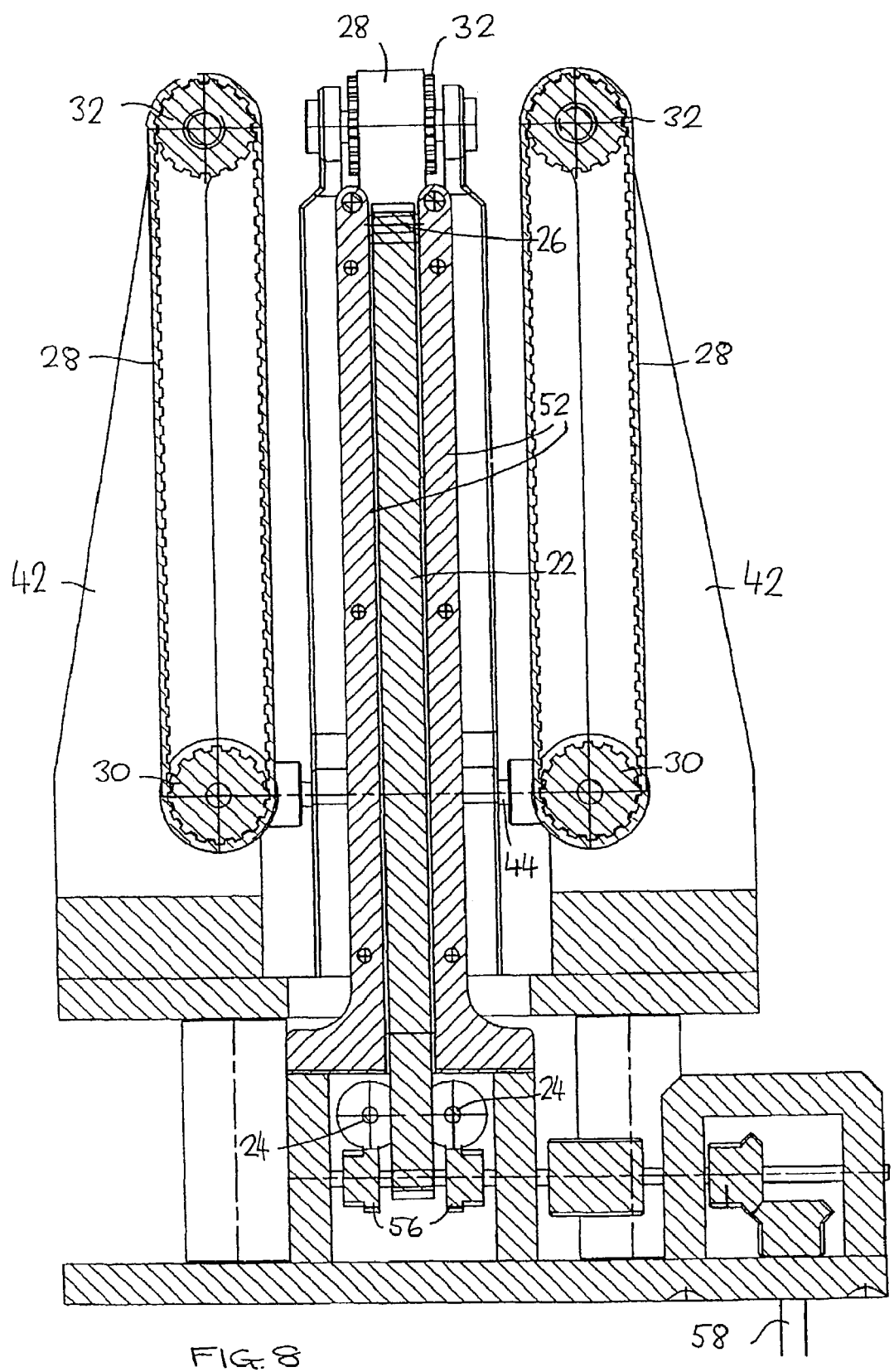
FIG. 8 is a side section of the support structure.

The support structure 16 of a handling device is shown in detail in FIGS. 6 to 8. For clarity, the gripping member 2 has been omitted.

The support structure 16 includes a base member 40 that serves, in use, to attach the device to, for example, a robot arm, and supports the inner and outer drive mechanisms 18, 20. The outer drive mechanism 20 includes four outer support arms 42 that support the outer drive belts 28 on near and far end pulleys 30, 32. The belts and the pulleys are toothed. The near end pulleys 30 are interconnected for synchronous movement by means of shafts 44 and bevel gears 46, and are driven from a drive shaft 48.

The inner drive mechanism 18 also includes four inner support arms 52 that support the inner drive belts 22 on near and far end pulleys 24, 26. Those belts and the pulleys are also toothed. The near end pulleys 24 are interconnected for synchronous movement by means of shafts 54 and left- and right-handed pairs of helical gears 56, and are driven from an inner drive shaft 58.

As shown in FIG. 7, the gripping member 2 is located between the four outer drive belts 28, which engage the outer wall portion 10b of the gripping member. The inner drive belts 22 engage the inner wall portion 10a of the gripping member.

At the centre of the base structure 40, between the four inner support arms 52, an object sensor 60 is provided. The object sensor 60 includes a light source and a light detector that are mounted remotely and connected to the sensing position through optical fibres. In use, the sensor detects light reflected from an object in the axial passageway 12 through the gripping member. Therefore, when an object is picked up by the handling device, the sensor 60 can detect its presence. Additional sensors (not shown) may be provided if required, for sensing the position of the gripping member 2 relative to the support structure 16. The output of those sensors may be used to control operation of the device and ensure that the gripping member is maintained in a good operating position and is not accidentally lost through being extended too far beyond the support structure.

Figure 9:
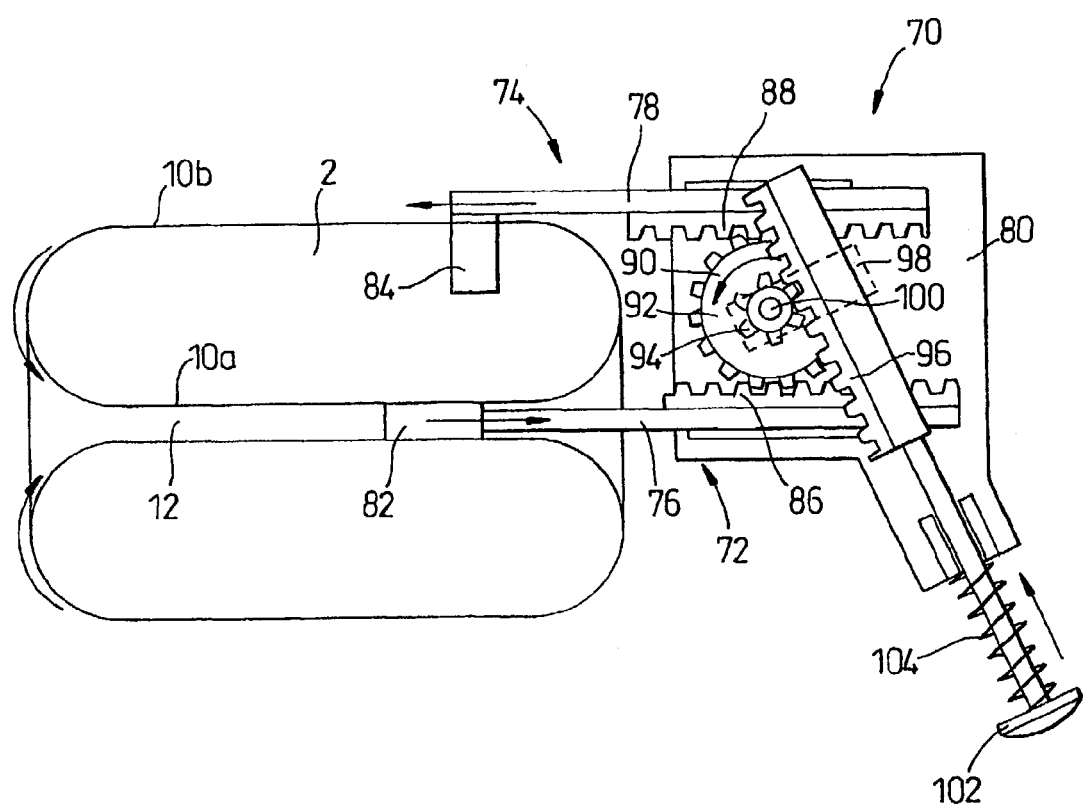
FIG. 9 is a side section of a hand-held handling device.

A further embodiment of the handling device is shown in FIG. 9. This version is intended for hand-held use, either by people who have difficulty handling small objects or maintaining a film hold (for example, people with disabilities or who suffer from a disease that impairs dexterity, such as Parkinson's disease), or for handling objects when touching with the hand is undesirable. This latter category of articles includes articles that are unpleasant or dangerous to touch, that are very fragile or delicate, or where contamination is to be avoided. Some examples include articles contaminated with dangerous chemical, radioactive and biological substances, excreta or other unpleasant substances, live spiders or laboratory animals, forensic evidence or human tissue during surgical procedures.

The handling device includes a toroidal gripping member 2 that is substantially as described above, and a hand-held support structure 70. The support structure 70 includes inner and outer drive mechanisms 72, 74 each of which includes a support arm 76, 78 that is mounted for sliding movement in a housing 80. At its free end, the inner support arm 76 includes a cylindrical member 82 that is either attached, for example by means of adhesive, to the inner wall portion 10a of the gripping member 2, or is simply gripped by the gripping member. The free end of the outer support arm 78 is attached to the outer wall portion 10b of the gripping member 2 through an attachment means 84 in the form of arcuate cross-member. Alternatively, the attachment means 84 may consist of a rigid circular band that encircles the gripping member 2.

Each support arm includes at its inner end a rack 86, 88 that is engaged by an outer gear 90 on a pinion 92 that is mounted in the housing 80. A second smaller gear 94 that forms part of the same pinion 92 and rotates with the first gear 90 is engaged by a drive-rack 96 that passes through a slide bracket 98 on which the axle 100 of the pinion is mounted. The drive rack 96 is attached to a sliding plunger 102 that is intended for manual operation and is biassed outwards by a compression spring 104 located between the plunger and the housing 80.

In use, pressing the plunger 102 inwards towards the housing 80 causes the pinion 92 to rotate anti-clockwise. This drives the outer support arm 78 outwards while drawing the inner support arm 76 inwards, with the result that the peripheral wall 10 of the gripping member 2 rotates so as to draw an object at the free end of the gripping member into the passageway 12. Releasing the plunger 102 causes the pinion 92 to rotate anti-clockwise, releasing the object from the passageway 12. The device may thus be used to pick up and release objects, simply by pressing and releasing the plunger 102.

The device shown in FIG. 9 may be modified to meet the needs of the user. For example, the drive rack 96 may be relocated onto the opposite side of the pinion 92, to reverse the action of the device, so that pulling the plunger 102 draws an object into the passageway. The plunger may also be oriented in different directions and, if used for example as a prosthetic device, it may be activated by a cable attached to the plunger 102 and the waist band of the user, causing the device to grip as the user extends his or her arm.

Figure 10:
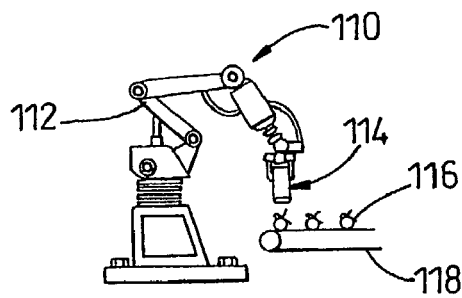
FIGS. 10 to 14 illustrate various possible applications of a handling device according to the invention.

Various different applications of handling devices as described are illustrated in FIGS. 10 to 14. FIG. 10 illustrates a robotic pick and place device 110 including a robot arm 112 having at one end a handling device 114 according to the present invention. The device is used to pick up and place fragile or delicate items, for example soft fruit 116, travelling on a conveyor belt 118.

Figure 11:
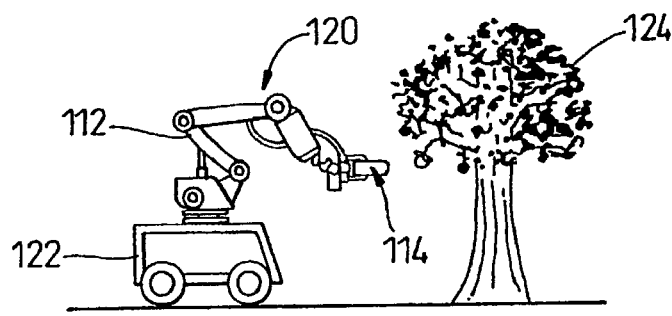

FIG. 11 shows a fruit harvesting machine 120 that includes a wheeled base 122, a robotic arm 112 and a handling device 114. The machine may be used for example for harvesting soft fruit, such as cherries, from a tree 124.

Figure 12:
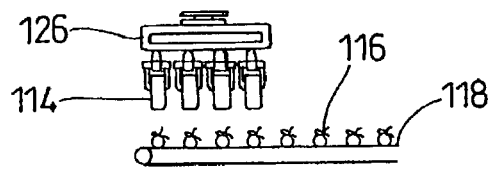

FIG. 12 illustrates the use of a plurality of handling devices 114 mounted on a common base structure 126 for handling a plurality of articles 116 simultaneously, for example on a conveyor belt 118.

Figure 13:
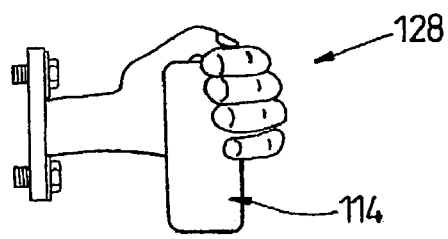

FIG. 13 illustrates the concept of a prosthetic attachment 128 that resembles a human hand and includes a handling device 114 according to the invention.

Figure 14:
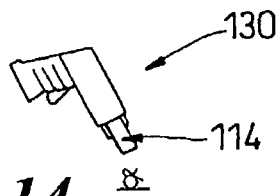

FIG. 14 illustrates a hand-held handling device 130 that includes a handling device 114 according to the invention, for use as a rehabilitation aid, for example by Parkinson's sufferers.

Figure 15A:
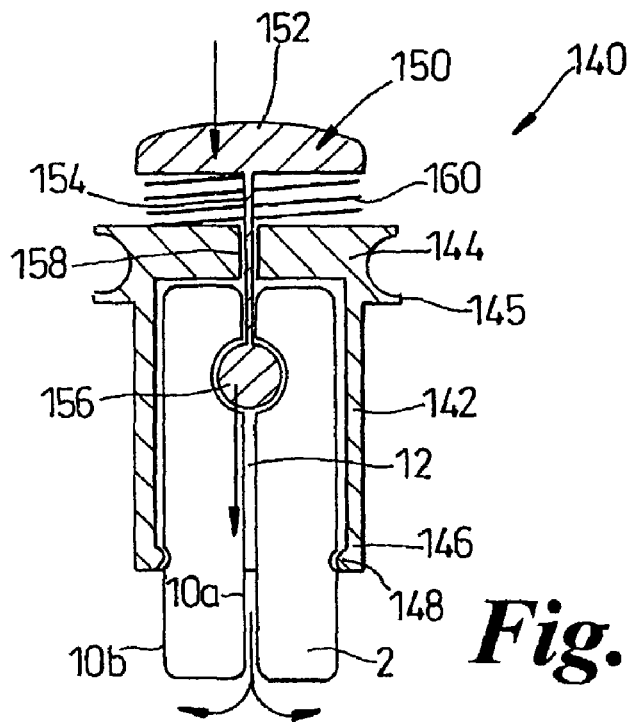
FIGS. 15a and 15b are side sections of further hand-held handling devices.
Figure 15B:
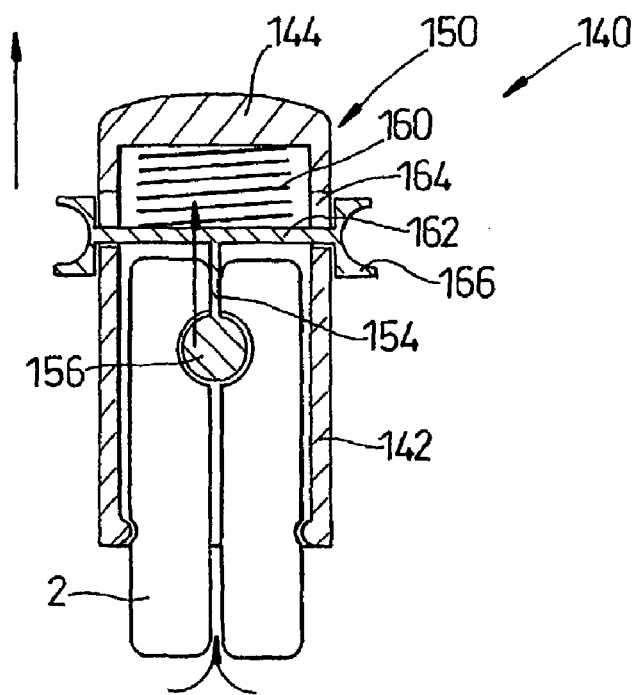
Figure 16:
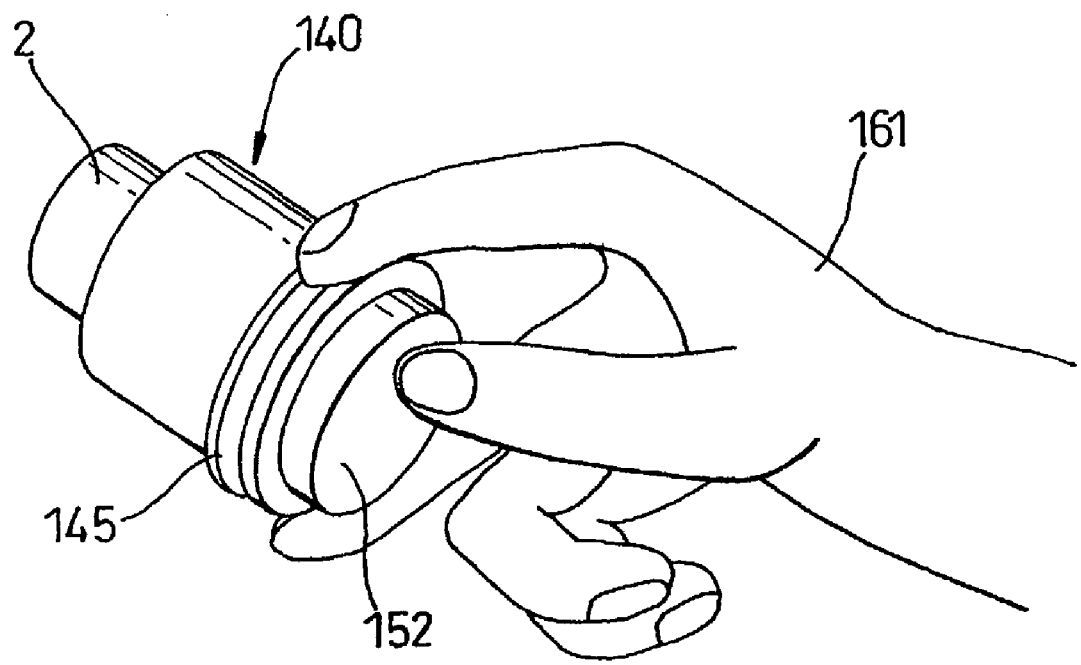

Two further hand-held handling devices 140 are shown in FIGS. 15a, 15b and 16, the version shown in FIG. 15b being a modification of the version shown in FIG. 15a.

The version shown in FIG. 15a includes a tubular substantially cylindrical support structure 142 that is closed at one end by a circular plate 144 and is open at the other end 146. Outwardly extending flanges 145 forming finger grips are provided at the closed end of the support structure and a narrow flange 148 that extends inwards is provided at the open end of the support structure 142. The toroidal gripping member 2 is located within the tubular support structure 142 and extends a short distance beyond its open end 146.

A manual drive mechanism 150 is provided, comprising an actuating button 152 that is connected by a shaft 154 to a spherical drive member 156. The shaft 154 extends through a bore 158 in the end plate 144, and the drive member 156 is gripped within the axial passageway 12 of the gripping member 2. The entire drive mechanism 150 is biassed outwards by a compression spring 160 located between the end plate 144 and the actuating button 152. The gripping member 2 is retained in position within the support structure 142 by gripping action of the gripping member on the drive member 156 and the flange 148. The entire drive mechanism 150 is biassed outwards by a compression spring 160 located between the end plate 144 and the actuating button 152.

To actuate the device, the actuating button 150 is pressed towards the support structure 142, driving the inner wall portion 10a of the gripping member 2 outwards relative to the outer wall portion 10b. The device is then placed against the object that is to be picked up and the button 152 is released, drawing the object into the passageway 12. The button 152 is pressed again to release the object. FIG. 16 shows how the device 140 is held for use in the user's hand 161.

The device shown in FIG. 15b is similar in most respects to that shown in FIG. 15a, the only significant difference being that the drive mechanism 150 has a cross-member 162 that is connected to the shaft 154 and extends outwards through slots 164 in the side wall of the tubular support structure 142, the outwardly-extending ends of the cross-member 162 being connected to finger grips 166. The spring 160 is captured between the cross-member 162 and the end plate 144.

Operation is reversed as compared to the device shown in FIG. 15a, in that the end plate 144 is pressed towards the finger grips 166 to grip an object and is released to release the object. Various modifications of the handling device are of course possible, some examples of which will now be described. The size of the device may be adapted according to its intended application, with the diameter of the gripping member varying from a few millimetres to a metre or more.

The pressure of the fluid (the gas or liquid) in the gripping member may be adjustable, to control how firmly the device grips an object. The device may include means for adjusting the pressure automatically during operation. This may be achieved, for example, by mounting one of the support arms 42 on a pivot and adjusting the position of that arm so that it presses harder or less hard against the wall 10 of the toroidal gripping member 2.

The device may include a mechanism for cleaning the gripping member during use, for example by rotating the gripping member against a cleaning surface or past a washing station. Alternatively, or in addition, the gripping member may be disposable or removable for cleaning.

What is claimed is:

1. A handling device including a gripping member and a support structure that supports the gripping member, wherein the gripping member includes a flexible, substantially toroidal wall member having an outer wall portion and an inner wall portion defining an axial passageway that extends through the gripping member, and a fluid that fills the volume enclosed by the wall member, and the support structure includes a drive mechanism that engages the wall member and is constructed and arranged to provide relative axial movement between the inner and outer wall portions, wherein the drive mechanism comprises an inner rotary drive mechanism that engages the inner wall portion and is constructed and arranged to provide relative axial movement between the inner wall portion and the support structure, and an outer rotary drive mechanism that engages the outer wall portion and is constructed and arranged to provide relative axial movement between the outer wall portion and the support structure, said inner and outer rotary drive mechanisms being operable to provide continuous rotation of the wall member.

2. A handling device according to claim 1, wherein the wall member is made of an elastomeric material.

3. A handling device according to claim 2, wherein the wall member is made of natural or synthetic rubber.

4. A handling device according to claim 1, wherein the gripping member is filled with a liquid.

5. A handling device according to claim 1, wherein the gripping member is filled with a gas.

6. A handling device according to claim 1, wherein the pressure of the fluid in the gripping member is substantially equal to atmospheric pressure.

7. A handling device according to claim 1, wherein the gripping member contains a lubricant.

8. A handling device according to claim 1, in which the inner and outer drive mechanisms are interlinked for opposed movement.

9. A handling device according to claim 1, in which the inner and outer drive mechanisms are capable of independent movement.

10. A handling device according to claim 1, in which the drive mechanism includes a drive belt that engages the wall member.

11. A handling device according to claim 1, including a plurality of radially-spaced drive mechanisms.

12. A handling device according to claim 1, in which the axial length of the toroidal wall member is greater than its diameter.

13. A handling device according to claim 12, in which the axial length of the toroidal wall member is at least twice its diameter.

14. A handling device according to claim 1, including a sensor for sensing the presence of an object in the passageway.

15. A handling device according to claim 14, in which the sensor senses light reflected from an object in the passageway.

16. A handling device including a gripping member and a support structure that supports the gripping member, wherein the gripping member includes a flexible, substantially toroidal wall member having an outer wall portion and an inner wall portion defining an axial passageway that extends through the gripping member, and a fluid that fills the volume enclosed by the wall member, and the support structure includes a drive mechanism that engages the wall member and is constructed and arranged to provide relative axial movement between the inner and outer wall portions, wherein the drive mechanism comprises an inner rotary drive mechanism that engages the inner wall portion and is constructed and arranged to provide relative axial movement between the inner wall portion and the support structure, and an outer rotary drive mechanism that engages the outer wall portion and is constructed and arranged to provide relative axial movement between the outer wall portion and the support structure, in which the inner and outer drive mechanisms are interlinked for opposed movement.

17. A handling device including a gripping member and a support structure that supports the gripping member, wherein the gripping member includes a flexible, substantially toroidal wall member having an outer wall portion and an inner wall portion defining an axial passageway that extends through the gripping member, and a fluid that fills the volume enclosed by the wall member, and the support structure includes a drive mechanism that engages the wall member and is constructed and arranged to provide relative axial movement between the inner and outer wall portions, in which the drive mechanism includes a drive belt that engages the wall member.

18. A handling device according to claim 17, wherein the drive mechanism engages a first one of said inner and outer wall portions, the support structure engages a second one of said inner and outer wall portions, the drive mechanism being constructed and arranged to provide relative axial movement between the first wall portion and the support structure.

* * * * *